Dec. 25, 1951     D. C. REEK     2,580,242
MOTOR CONTROL
Filed Feb. 27, 1951
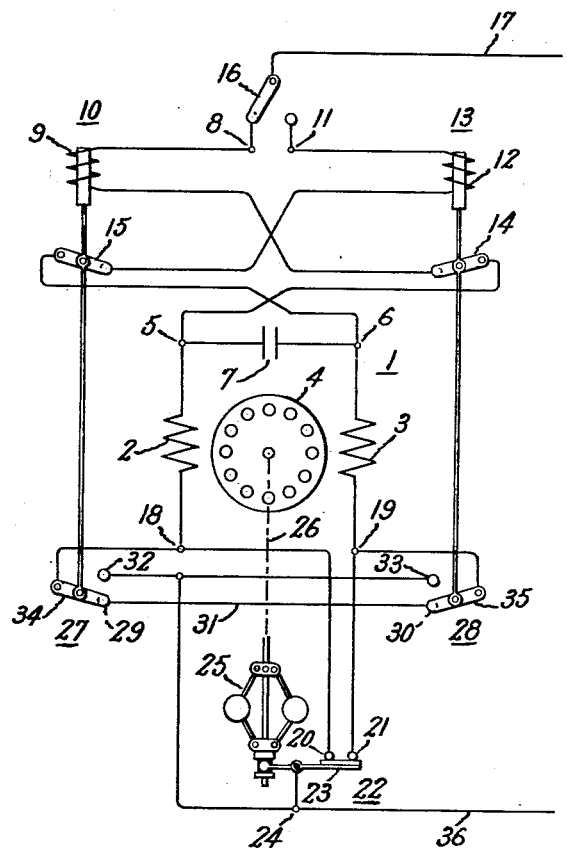
Inventor:
Donald C. Reek,
by *Ernest C. Britton*
His Attorney.

Patented Dec. 25, 1951

2,580,242

UNITED STATES PATENT OFFICE 2,580,242

MOTOR CONTROL

Donald C. Reek, Fort Wayne, Ind., assignor to General Electric Company, a corporation of New York Application February 27, 1951, Serial No. 213,000

24 Claims. (Cl. 318—203)

This invention relates to the control of single phase alternating current motors and more particularly to a control system providing instant reversal of single phase alternating current motors with only three external terminals being required.

Single phase alternating current motors which can be instantly reversed are frequently required for such applications as hoists and door openers. In the design of a circuit to provide instant reversal of a single phase alternating current motor, it is desirable that instantaneous switching from one direction of rotation to the other be provided and that a minimum number of external terminals be required so that the motor may be reversed by means of a single pole double-throw switch conventional motor reversal circuits having often required the use of a multi-pole reversing switch and a large number of leads from the switch to the motor.

An object of this invention therefore is to provide an instantly reversible single phase alternating current motor circuit requiring only three external leads.

A further object of this invention is to provide an improved control circuit for an instantly reversible single phase alternating current motor characterized by its simplicity and the fact that a single pole double throw switch may be used to secure motor reversal.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspects, this invention provides a single phase alternating current motor having a pair of field exciting windings. Reactance means is connected between the windings in order to electrically displace one winding with respect to the other so that a rotating field is provided for starting. Each of the field windings is adapted to be selectively connected to a source of alternating current so that the winding so connected is directly energized and the other field winding is energized through the reactance so that the motor starts in one direction of rotation. Means are provided for disconnecting both of the field windings from the source of alternating current at a predetermined speed and means are also provided responsive to the current flowing in the directly energized winding for rendering the disconnecting means ineffective insofar as the directly energized winding is concerned so that only the reactance energized winding is disconnected at the predetermined speed. Operation of the selective means to connect the other field winding for direct energization produces reversal of the motor. The current responsive means may also be operable to connect the two field windings together when neither winding is connected for direct energization in order to provide a regenerative braking circuit. In addition, the current responsive means may also be operable to render direct energization of the reactance energized winding impossible at the instant the selection means is operated.

The single figure of the drawing is a schematic illustration showing the improved instantly reversible motor circuit of this invention.

Referring now to the drawing, there is shown a single phase alternating current induction motor 1 having a pair of field exciting windings 2 and 3 and a squirrel cage rotor 4. Ends 5 and 6 of field windings 2 and 3 respectively are connected by a capacitor 7 in order to electrically displace the field windings 2 and 3 to provide a rotating field for starting. Terminal 5 of field winding 2 is connected to external terminal 8 with operating coil 9 of relay 10 being arranged in series therewith. End 6 of field winding 3 is similarly connected to external terminal 11 with operating coil 12 of relay 13 being connected in series therewith. Contact 14 operated by operating coil 12 of relay 13 is interposed in series between end 5 of field winding 2 and relay operating coil 9, and contact 15 operated by operating coil 9 of relay 10 is likewise interposed in series between end 6 of field winding 3 and operating coil 12 of relay 13. Single pole double throw switch 16 is provided to selectively connect either external terminal 8 or external terminal 11 to side 17 of an external source of alternating current (not shown).

In order to complete the circuit for energization of the field windings 2 and 3, ends 18 and 19 thereof are respectively connected to stationary contacts 20 and 21 of switch 22. The movable contact 23 of switch 22 is connected to the third external terminal 24 and is arranged for operation by the centrifugal mechanism 25 on the shaft 26 of rotor 4. Each of the relays 10 and 13 are also provided with double throw contacts 27 and 28 respectively, the positions 29 and 30 of the contacts 27 and 28 respectively being connected as at 31 and the positions 32 and 33 being connected to the external terminal 24. The movable elements 34 and 35 of contacts 27 and 28 are respectively connected to ends 18 and 19 of field windings 2 and 3. Terminal 24 is adapted to be connected to the other side 36 of the external alternating current source.

In operation, with the motor initially at a standstill, assuming that the single pole double throw switch 16 is thrown to the left connecting the external line 17 to the external terminal 8, current will flow through the operating coil 9, contact 14, field winding 2, and speed responsive switch 22 to external terminal 24 and line 36. Thus, field winding 2 will be directly energized by virtue of the circuit just described and it will be readily apparent that field winding 3 will also be energized through capacitor 7. The motor will thus start in one direction of rotation and, since operating coil 9 of relay 10 is now energized, contact 15 will open and movable element 34 of contact 27 will shift from position 29 to position 32. Thus, contact 15 has opened the circuit of operating coil 12 of relay 13, which is not energized, and contact 27 has directly connected field winding 2 to the external terminal 24 around the speed responsive switch 22. When the motor speed has reached a predetermined value, the centrifugal mechanism 25 will actuate the movable contact 23 of the switch 22 opening the circuit of the field windings 2 and 3. However, as described above, the energization of the operating coil 9 of relay 10 has caused contact 27 to connect the field winding 2 directly to the external terminal 24 and thus only the capacitor energized field winding 3 is disconnected from the source of alternating current. At this point, the motor is running normally in the direction of rotation selected by switch 16 with only the field winding 2 energized.

In order to reverse the direction of rotation of the motor, the switch 16 is thrown to connect the external terminal 11 to the line 17. If this switching is done instantaneously, the contacts 15 and 27 of relay 10 will not have dropped back to their normal position when the switching is completed and therefore at this instant there will be no current flowing in the operating coil 12 of relay 13 and in field winding 3 since contact 15 will still be open. The operating coil 9 of relay 10 being deenergized, will now drop out closing contact 15 and returning the movable element 34 of contact 27 to position 29. However, since the motor will still be turning in the first direction of rotation at a speed above the cut-in speed of switch 22, speed responsive switch 22 will still be open so there will be no complete circuit from line 17 to line 36 to energize field windings 2 and 3. However, with movable elements 34 and 35 of contacts 27 and 28 in positions 29 and 30, as shown in the drawing, a regenerative braking circuit is established since field windings 2 and 3 are connected by line 31, through the contacts 27 and 28 and the capacitor 7. Thus, the motor is regeneratively braked back to the cut-in speed of the centrifugal mechanism 25. At this point, the mechanism allows movable contact 23 of switch 22 to close establishing a circuit from terminal 24 through field winding 3, contact 15, operating coil 12 of relay 13, to terminal 11, switch 16 and line 17. Field winding 2 will now also be energized through capacitor 7. Operating coil 12 of relay 13 will then be energized opening contact 14 and moving contact 28 from its position 30 to its position 33. When reversal is completed, the motor will be rotating in the opposite direction. It will be seen that movable element 35 of contact 28 moving to position 33 has connected field winding 3 directly across switch 22 to the terminal 24 so that when centrifugal mechanism 25 opens the movable contact 23 disconnecting field winding 2, field winding 3 will still remain in the circuit. It will now be seen that the motor is running in the opposite direction on field winding 3.

It will now be readily apparent that this circuit provides a symmetrical system in which either the field winding 2 or 3 is energized directly from the external source of alternating current depending upon the position selected by the switch 16, the other winding being energized through the capacitor 7 to serve as a starting winding. It will also be readily apparent that only three external terminals are necessary, i. e. terminals 8, 11 and 24, so that in the event the switch 16 is physically removed from the motor 1, only three leads will be necessary from the motor to the switch and line. This improved circuit permits instantaneous operation of the switch 16 and responsive to such operation, the motor will be regeneratively braked and started in the opposite direction. The circuit is characterized by its simplicity since the only additional elements required to permit instantaneous reversal are the two double pole double throw current relays 10 and 13 which pick up on locked rotor current and hold in on running current.

While I have shown and described a particular embodiment of this invention, further modifications and improvements will occur to those skilled in the art. I desire it to be understood therefore that this invention is not limited to the embodiments shown and I intend in the appended claims to cover all modifications within the spirit and scope of this invention.

What I claim as new and desire to secure by Letters Patent of the United States is:

1. In combination, a single phase alternating current motor having two field exciting windings, reactance means arranged in circuit with said windings for electrically displacing one of said field windings with respect to the other to provide a rotating field for starting, means for selectively connecting one of said field windings for energization directly from a source of alternating current, the other of said field windings being energized through said reactance means whereby said motor starts in one direction of rotation, means for disconnecting said field windings from said alternating current source at a predetermined speed, and means responsive to the current in said directly connected field winding for rendering said disconnecting means ineffective with respect to said directly connected winding whereby only said reactance energized field winding is disconnected at said predetermined speed, said current responsive means being adapted to connect said field windings to establish a regenerative braking circuit when neither of said field windings is connected for energization, operation of said selective connecting means to connect the other of said field windings for direct energization causing reversal of said motor.

2. In combination, a single phase alternating current motor having two field exciting windings, reactance means connected between one end of each of said field windings for electrically displacing one of said field windings with respect to the other to provide a rotating field for starting, means for selectively connecting said one end of one of said field windings for energization directly from one side of a source of alternating current, the other of said field windings being energized through said reactance means whereby said motor starts in one direction of rotation, the other ends of said field windings being adapted to be connected to the other side of said source, means for disconnecting said other ends of said field windings from said other side of said source at a predetermined speed, and means responsive to the current in said directly connected winding for rendering said disconnecting means ineffective with respect to said directly connected winding whereby only said reactance excited winding is disconnected at said predetermined speed, said current responsive means being adapted to connect the other ends of said field windings to establish a regenerative braking circuit when neither of said field windings is connected for energization, operation of said selective connecting means to connect the other of said field windings for direct energization causing reversal of said motor.

3. In combination, a single phase alternating current motor having two field exciting windings, a capacitor connected between one end of each of said field windings for electrically displacing one of said field windings with respect to the other to provide a rotating field for starting, means for selectively connecting said one end of one of said field windings for energization directly from one side of a source of alternating current, the other of said field windings being energized through said capacitor whereby said motor starts in one direction of rotation, the other ends of said field windings being adapted to be connected to the other side of said source, speed responsive means arranged in circuit with said other ends of said field windings for disconnecting said field windings from said source at a predetermined speed, each of said field windings having current responsive means arranged in circuit therewith respectively operable in response to current in the field winding connected for direct energization to connect said other end of said directly energized field winding directly to said other side of said source rendering said speed responsive means ineffective with respect to said directly energized winding whereby only said capacitor energized winding is disconnected at said predetermined speed, said current responsive means being operable when neither of said field windings is connected for direct energization to connect said other ends of said field windings for establishing a regenerative braking circuit, operation of said selective connecting means to connect the other of said field windings for direct energization causing reversal of said motor.

4. In combination, a single phase alternating current motor having two field exciting windings, a capacitor connected between one end of each of said field windings for electrically displacing one of said field windings with respect to the other to provide a rotating field for starting, means for selectively connecting said one end of one of said field windings for energization directly from one side of a source of alternating current, the other of said field windings being energized through said capacitor whereby said motor starts in one direction of rotation, the other ends of said field windings being adapted to be connected to the other side of said source, and speed responsive means arranged in circuit with said other ends of said field windings for disconnecting said field windings from said source at a predetermined speed, each of said field windings having current responsive means arranged in circuit therewith respectively operable in response to current in the field winding connected for direct energization to connect said other end of said directly energized field winding directly to said other side of said source rendering said speed responsive means ineffective with respect to said directly energized winding whereby only said capacitor energized winding is disconnected at said predetermined speed, said current responsive means being operable when neither of said field windings is connected for direct energization to connect said other ends of said field windings for establishing a regenerative braking circuit, said current responsive means being respectively operable in response to current in said directly connected field winding to prevent direct energization of said capacitor energized field winding, operation of said selective connecting means to connect the other of said field windings for direct energization causing reversal of said motor.

5. In combination, a single phase alternating current motor having two field exciting windings, a capacitor connected between one end of each of said field windings for electrically displacing one of said field windings with respect to the other to provide a rotating field for starting, each of said field windings having a relay operating coil connected in series with said one end thereof forming a first and second circuit, means for selectively connecting one of said circuits to one side of source of alternating current whereby one of said field windings is directly energized and the other is energized through said capacitor so that said motor starts in one direction of rotation, said other ends of said field windings being adapted to be connected to the other side of said source, a switch operable in response to the speed of said motor for disconnecting said other ends of said field windings from said other side of said source at a predetermined speed, two contacts respectively operable by said relay operating coils in response to current in the circuit connected by said selective connecting means and arranged to connect said other end of said directly energized winding directly to said other side of said source rendering said switch ineffective with respect to said last named winding whereby only said capacitor energized field winding is disconnected at said predetermined speed, said contacts being arranged to connect said other ends of said field windings when neither of said operating coils is energized to establish a regenerative braking connection, operation of said selective connecting means to connect the other of said circuits causing reversal of said motor.

6. In combination, a single phase alternating current motor having two field exciting windings, a capacitor connected between one end of each of said field windings for electrically displacing one of said field windings with respect to the other to provide a rotating field for starting, each of said field windings having said one end connected to one end of a relay operating coil, means for selectively connecting the other end of one of said operating coils to one side of a source of alternating current so that the field winding associated with said one coil is directly energized and the other field winding is energized through said capacitor whereby said motor starts in one direction of rotation, said other ends of said field windings being adapted to be connected to the other side of said source, and a switch operable in response to the speed of said motor and arranged in circuit with said other ends of said field windings for disconnecting said other ends of said field windings from said other side of said source at a predetermined speed, each of said relay operating coils having a pair of contacts operable thereby responsive to current flow therein, one of each of said pair of contacts being a double throw contact, said double throw contacts being effective in one position responsive respectively to energization of said operating coils to connect the other end of said directly energized winding to the other side of said source rendering said switch ineffective with respect to said energized winding whereby only said capacitor energized field winding is disconnected at said predetermined speed, said double throw contacts being effective in the other position when neither of said relay coils is energized to connect said other ends of said field windings to establish a regenerative braking circuit, said other contacts being operable responsive respectively to energization of said relay operating coils to prevent direct energization of said capacitor energized field winding, operation of said selective connecting means to connect the other of said relay coils to said one side of said source and the other of said field windings for direct energization causing reversal of said motor.

7. In an instantly reversible single phase alternating current motor, two field exciting windings, reactance means connected in circuit with said field windings for electrically displacing one of said field windings with respect to the other to provide a rotating field for starting, said field windings being respectively connected to a pair of terminals adapted to be selectively connected to a source of alternating current whereby one of said field windings is directly energized and the other is energized through said reactance means so that said motor starts in one direction of rotation, means for disconnecting said field windings from said source at a predetermined speed, and means responsive to current in said directly energized field winding for rendering said disconnecting means ineffective with respect to said last named field winding whereby only said reactance energized field winding is disconnected at said predetermined speed, selection of the other of said field windings for direct energization causing reversal of said motor.

8. In an instantly reversible single phase alternating current motor, two field exciting windings, reactance means connected in circuit with said field windings for electrically displacing one of said field windings with respect to the other to provide a rotating field for starting, said field windings being respectively connected to a pair of terminals adapted to be selectively connected to a source of alternating current whereby one of said field windings is directly energized and the other is energized through said reactance means so that said motor starts in one direction of rotation, means for disconnecting said field windings from said source at a predetermined speed, and means responsive to current in said directly energized field winding for rendering said disconnecting means ineffective with respect to said last named field winding whereby only said reactance energized field winding is disconnected at said predetermined speed, said current responsive means being adapted to connect said field windings to establish a regenerative braking circuit when neither of said field windings is connected for direct energization, selection of the other of said field windings for direct energization causing reversal of said motor.

9. In an instantly reversible single phase alternating current motor, two field exciting windings, a capacitor connected between one end of each of said field windings for electrically displacing one of said field windings with respect to the other to provide a rotating field for starting, said one end of each of said field windings being connected to a terminal, said terminals being adapted to be selectively connected to one side of a source of alternating current whereby one of said field windings is directly energized and the other is energized through said capacitor so that said motor starts in one direction of rotation, the other ends of said field windings being connected to a third terminal adapted to be connected to the other side of said source, and speed responsive means arranged to disconnect said other ends of said field windings from said third terminal at a predetermined speed, each of said field windings having current responsive means arranged in circuit therewith respectively operable in response to current in the field winding connected for direct energization to connect said other end of said directly energized field winding directly to said third terminal rendering said speed responsive means ineffective with respect to said directly energized winding whereby only said capacitor energized winding is disconnected at said predetermined speed, said current responsive means being operable when neither of said field windings is connected for direct energization to connect said other ends of said field windings for establishing a regenerative braking circuit, selection of the other of said field windings for direct energization causing the reversal of said motor.

10. In an instantly reversible single phase alternating current motor, two field exciting windings, a capacitor connected between one end of each of said field windings for electrically displacing one of said field windings with respect to the other to provide a rotating field for starting, said one end of each of said field windings being connected to a terminal, said terminals being adapted to be selectively connected to one side of a source of alternating current whereby one of said field windings is directly energized and the other is energized through said capacitor so that said motor starts in one direction of rotation, the other ends of said field windings being connected to a third terminal adapted to be connected to the other side of said source, and speed responsive means arranged to disconnect said other ends of said field winding from said third terminal at a predetermined speed, each of said field windings having current responsive means arranged in circuit therewith respectively operable in response to current in the field winding connected for direct energization to connect said other end of said directly energized field winding directly to said third terminal rendering said speed responsive means ineffective wth respect to said directly energized winding whereby only said capacitor energized winding is disconnected at said predetermined speed, said current responsive means being operable when neither of said field windings is connected for direct energization to connect said other ends of said field windings for establishing a regenerative braking circuit, said current responsive means being respectively operable in response to current in said directly connected field winding to prevent direct energization of said capacitor energized for field winding, selection of the other of said field windings for direct energization causing reversal of said motor.

11. In an instantly reversible single phase alternating current motor, two field exciting windings, a capacitor connected between one end of each of said field windings for electrically displacing one of said field windings with respect to the other to provide a rotating field for starting, each of field windings having a relay operating coil connected in series with said one end thereof, the other end of each of said operating coils being connected to a terminal, said terminals being adapted to be selectively connected to one side of a source of alternating current whereby one of said field windings is directly energized and the other is energized through said capacitor so that said motor starts in one direction of rotation, the other ends of said field windings being connected to a third terminal adapted to be connected to the other side of said source, a switch operable in response to the speed of said motor to disconnect said other end of said field windings from said third terminal at a predetermined speed, two contacts respectively operable by said relay operating coils in response to current in the field winding connected for direct energization and arranged to connect said other end of said directly energized field winding directly to said third terminal rendering said switch ineffective with respect to said directly energized field winding whereby only said capacitor energized field winding is disconnected at said predetermined speed, said contacts being arranged to connect said other ends of said field windings when neither of said operating coils are energized to establish a regenerative braking connection, selection of the other of said field windings for direct energization causing reversal of said motor.

12. In an instantly reversible single phase alternating current motor, two field exciting windings, a capacitor connected between one end of each of said field windings for electrically displacing one of said field windings with respect to the other to provide a rotating field for starting, each of said field windings having said one end connected to one end of a relay operating coil, the other end of each of said operating coils being connected to a terminal, said terminals being adapted to be selectively connected to one side of a source of alternating current whereby one of said field windings is directly energized and the other is energized through said capacitor, so that said motor starts in one direction of rotation, said other ends of said field windings being connected to a third terminal adapted to be connected to the other side of said source, and a switch operable in response to the speed of said motor and arranged in circuit with said other ends of said field windings for disconnectng said other ends of said field windings from said third terminal at a predetermined speed, each of said relay operating coils having a pair of contacts operable thereby responsive to current flow therein, one of each of said pair of contacts being a double throw contact, said double throw contacts being effective in one position responsive respectively to energization of said operation coils to connect the other end of said directly energized winding to said third terminal rendering said switch ineffective with respect to said directly energized winding whereby only said capacitor energized field winding is disconnected at said predetermined speed, said double throw contacts being effective in the other position when neither of said relay coils is energized to connect said other ends of said field windings to establish a regenerative braking circuit, said other contactor being operable responsive respectively to energization of said relay operating coils to prevent direct energization of said capacitor energized field winding.

13. In an instantly reversible single phase alternating current motor, two field exciting windings, a capacitor connected between one end of each of said field windings for electrically displacing one of said field windings with respect to the other to provide a rotating field for starting, each of said field windings having said one end connected to one end of a relay operating coil, three external terminals, the other ends of each of said relay operating coils being respectively connected to two of said terminals, said two terminals being adapted to be selectively connected to one side of a source of alternating current whereby one of said field windings is directly energized and the other is energized through said capacitor so that said motor starts in one direction of rotation, the other ends of said field windings being connected to the third of said terminals, and a switch operable in response to the speed of said motor and arranged in circuit with said other ends of said field windings for disconnecting said other ends of said field windings from said third terminal at a predetermined speed, each of said relay operating coils having a contact operable thereby responsive to current flow therein, said contacts being effective in one position responsive respectively to energization of said operating coils to connect the other end of said directly energized winding to said third terminal rendering said switch ineffective with respect to said directly energized winding whereby only said capacitor energized field winding is disconnected at said predetermined speed, said contacts being effective in the other position when neither of said relay coils is energized to connect said other ends of said field windings to establish a regenerative braking circuit, selection of the other of said field windings for direct energization causing reversal of said motor.

14. In an instantly reversible single phase alternating current motor, two field exciting windings, a capacitor connected between one end of each of said windings for electrically displacing one of said field windings with respect to the other to provide a rotating field for starting, three external terminals, each of said field windings having said one end connected to one end of the relay operating coil, the other ends of said relay operating coils being respectively connected to two of said terminals, said two terminals being adapted to be selectively connected to one side of a source of alternating current whereby one of said field windings is directly energized and the other is energized through said capacitor so that said motor starts in one direction of rotation, said other ends of said field windings being connected to said third terminal, said third terminal being adapted to be connected to the other side of said source, and a switch operable in response to the speed of said motor and arranged in circuit with said other ends of said field windings for disconnecting said other ends of said field windings from said third terminal at a predetermined speed, each of said relay operating coils having a pair of contacts operable thereby responsive to current flow therein, one of each of said pair of contacts being a double throw contact, said double throw contacts being effective in one position responsive respectively to energization of said operating coils to connect the other end of said directly energized winding to the said third terminal rendering said switch ineffective with respect to said directly energized winding whereby only said capacitor energized field winding is disconnected at said predetermined speed, said double throw contacts being effective in the other position when neither of said relay coils are energized to connect said other ends of said field windings to establish a regenerative braking circuit, said other contacts being operable responsive respectively to energization of said relay operating coils to prevent direct energization of said capacitor energized field winding, selection of the other of said field windings for direct energization causing reversal of said motor.

15. In an instantly reversible single phase alternating current motor, two field windings, a reactance means arranged in circuit with said windings for electrically displacing one of said field windings with respect to the other to provide a rotating field for starting, three external terminals, one end of said field windings being respectively connected to two of said terminals, said two terminals being adapted to be selectively connected to one side of a source of alternating current whereby one of said field windings is directly energized and the other is energized through said capacitor so that said motor starts in one direction of rotation, the other ends of said field windings being connected to a third of said terminal, said third terminal being adapted to be connected to the other side of said source, means for disconnecting said field windings from said third terminal at a predetermined speed, and means responsive to the current in said directly connected field winding for rendering said disconnecting means ineffective with respect to said directly energized winding whereby only said reactance energized field winding is disconnected at said predetermined speed, said current responsive means being adapted to connect said field windings to establish regenerative braking circuit when neither of said field windings is connected for direct energization, selection of the other of said field windings for direct energization causes reversal of said motor.

16. In an instantly reversible single phase alternating current motor, two field exciting windings, reactance means arranged in circuit with said windings for electrically displacing one of said field windings with respect to the other to provide a rotating field for starting, three external terminals, one end of said field windings being respectively connected to two of said terminals, said two terminals being adapted to be selectively connected to one side of a source of alternating current whereby one of said field windings is directly energized and the other is energized through said capacitor so that said motor starts in one direction of rotation, the other ends of said field windings being connected to the third of said terminals, said third terminal being adapted to be connected to the other side of said source, means for disconnecting said field windings from said third terminal at a predetermined speed, and means responsive to the current in said directly energized field winding for rendering said disconnecting means ineffective with respect to said directly energized winding whereby only said reactance energized field winding is disconnected to said predetermined speed, selection of the other of said field windings for direct energization causes reversal of said motor.

17. A control system for an instantly reversible single phase alternating current motor having two field exciting windings, reactance means arranged in circuit with said windings for electrically displacing one of said field windings with respect to the other to provide a rotating field for starting, and means for opening the circuit of each of said field windings at a predetermined speed; said system comprising means for selectively connecting one of said field windings for energization directly from a source of alternating current, the other of said field windings being energized through said reactance means whereby said motor starts in one direction of rotation, and means responsive to the current in said directly connected field winding for rendering said disconnecting means ineffective with respect to said directly connected winding whereby only said reactance energized field winding is disconnected to said predetermined speed, operation of said selective connecting means to connect the other of said field windings for direct energization causing reversal of said motor.

18. A control system for an instantly reversible single phase alternating current motor having two field exciting windings, reactance means arranged in circuit with said windings for electrically displacing one of said field windings with respect to the other to provide a rotating field for starting, and means for opening the circuit of each of said field windings at a predetermined speed; said system comprising means for selectively connecting one of said field windings for energization directly from a source of alternating current, the other of said field windings being energized through said reactance means whereby said motor starts in one direction of rotation, and means responsive to the current in said directly connected field winding for rendering said disconnecting means ineffective with respect to said directly connected winding whereby only said reactance energized field winding is disconnected to said predetermined speed, said current responsive means being adapted to connect said field windings to establish a regenerative braking circuit when neither of said field windings is connected for energization, operation of said selective connecting means to connect the other of said field windings for direct energization causing reversal of said motor.

19. A control system for an instantly reversible single phase motor having two field windings, a capacitor connected between one end of each of said field windings for electrically displacing one of said field windings with respect to the other to provide a rotating field for starting, and speed responsive means arranged in circuit with the other ends of said field windings for disconnecting said field windings from said source at a predetermined speed; said system comprising means for selectively connecting said one end of one of said field windings for energization directly from one side of a source of alternating current, the other of said field windings being energized through said capacitor whereby said motor starts in one direction of rotation, and current responsive means arranged respectively in circuit with each of said field windings and respectively operable in response to current in the field winding connected for direct energization to connect said other end of said directly energized field winding directly to said source rendering said speed responsive means ineffective with respect to said directly energized winding whereby only said capacitor energized windings disconnected at said predetermined speed, said current responsive means being operable when neither of said field windings is connected for direct energization to connect said other ends of said field windings for establishing a regenerative braking circuit, operation of said selective connecting means to connect the other of said field windings for energization causing reversal of said motor.

20. A control system for an instantly reversible single phase alternating current motor having two field exciting windings, a capacitor connected between one end of each of said field windings for electrically displacing one of said field windings with respect to the other to provide a rotating field for starting, and speed responsive means arranged in circuit with the other ends of said field windings for opening the circuit of said field windings at a predetermined speed; said system comprising means for selectively connecting said one end of one of said field windings for energization directly from one side of a source of alternating current, the other of said field windings being energized through said capacitor whereby said motor starts in one direction of rotation, and current responsive means respectively arranged in circuit with each of said field windings and respectively operable in response to current in the field winding connected for direct energization to connect said other end of said directly energized field winding directly to said source rendering said speed responsive means ineffective with respect to said directly energized winding whereby only said capacitor energized winding is disconnected at said predetermined speed, said current responsive means being operable when neither of said field windings is connected for direct energization to connect said other ends of said field windings for establishing a regenerative braking circuit, said current responsive means being respectively operable in response to current in said directly energized winding to prevent direct energization of said capacitor energized winding, operation of said selective connecting means to connect the other of said selective connecting means to connect the other of said field windings causing reversal of said motor.

21. A control system for an instantly reversible single phase alternating current motor having two field exciting windings, a capacitor connected between one end of each of said field windings for electrically displacing one of said field windings with respect to the other to provide a rotating field for starting, and a switch operable in response to the speed of said motor and arranged in circuit with the other ends of said field windings for opening the circuit of said field windings at a predetermined speed; said system comprising two relay operating coils each having one end connected to one end of one of said field windings, means for selectively connecting the other end of one of said operating coils to one side of a source of alternating current so that the field winding associated with said one coil is directly energized and the other field winding is energized through said capacitor whereby said motor starts in one direction of rotation, each of said relay operating coils having a contact operable thereby responsive to current flow therein, said contacts being effective in one position responsive respectively to energization of said operating coils to connect the other end of said directly energized winding to said source rendering said switch ineffective with respect to said directly energized winding whereby only said capacitor energized field winding is disconnected at said predetermined speed, said contacts being respectively effective in the other position when neither of said relay coils are energized to connect said other ends of said field windings to establish a regenerative braking circuit, operation of said selective connecting means to connect the other of said relay coils to said source and the other of said field windings for direct energization causing reversal of said motor.

22. A control system for an instantly reversible single phase alternating current motor having two field exciting windings, a capacitor connected between one end of each of said field windings for electrically displacing one of said field windings with respect to the other to provide a rotating field for starting, and a switch operable in response to the speed of said motor and arranged in circuit with the other ends of said field windings for opening the circuit of said field windings at a predetermined speed; said system comprising a pair of relay operating coils each having one end connected to one end of one of said field windings, means for selectively connecting the other end of one of said operating coils to one side of a source of alternating current so that the field winding associated with said one coil is directly energized and the other field winding is energized through said capacitor whereby said motor starts in one direction of rotation, each of said relay operating coils having a pair of contacts operable thereby responsive to current flow therein, one of each of said pair of contacts being a double throw contact, said double throw contacts being effective in one position responsive respectively to energization of said operating coils to connect the other end of said directly energized winding to the other side of said source rendering said switch ineffective with respect to said directly energized winding whereby only said capacitor energized field winding is disconnected at said predetermined speed, said double throw contacts being effective in the other position when neither of said relay coils are energized to connect said other ends of said field windings to establish a regenerative braking circuit, said other contacts being respectively operable in response to current in said directly connected field winding to prevent direct energization of said capacitor energized field winding, operation of said selective connecting means to connect the other of said relay coils to said one side of said source and the other of said field windings for direct energization causing reversal of said motor.

23. In combination, a single phase alternating current motor having two field exciting windings, reactance means arranged in circuit with said windings for electrically displacing one of said field windings with respect to the other to provide a rotating field for starting, means for selectively connecting one of said field windings for energization directly from a source of alternating current, the other of said field windings being energized through said reactance means whereby said motor starts in one direction of rotation, means for disconnecting said field windings from said alternating current source at a predetermined speed, and means responsive to the current in said directly connected field windings for rendering said disconnecting means ineffective with respect to said directly connected winding whereby only said reactance energized field winding is disconnected at said predetermined speed, operation of said selective connecting means to connect the other of said field windings for direct energization causing reversal of said motor.

24. An instantly reversible single phase alternating current motor comprising two field exciting windings, a capacitor connecting one end of each of said windings for electrically displacing one of said windings with respect to the other to provide a rotating field for starting, a pair of relay operating coils respectively arranged in series with said first ends of said field windings, three external terminals, said relay operating coil being respectively connected to two of said terminals, a switch operable in response to the speed of said motor having its movable element connected to the third of said terminals, the other ends of said field windings being respectively connected to two stationary contacts of said switch whereby said switch opens the circuit of said field windings at a predetermined speed, said third terminal being adapted to be connected to one side of a source of alternating current, said two terminals being adapted to being selectively connected to the other side of said source of alternating current whereby one of said relay operating coils is energized and one of said field windings is directly energized, the other of said field windings is being energized through said capacitor, each of said relay operating coils having a pair of contacts associated therewith, one of each of said pair of contacts being a double throw contact, the other contact of each of said operating coils being arranged in series with the field winding associated with the other of said coils whereby direct energization of said capacitor energized field winding is prevented, said double throw contacts being respectively operable responsive to energization of said coils to connect said directly energized winding to said third terminal rendering said switch ineffective with respect to said directly energized winding whereby only said capacitor energized field winding is disconnected, said double throw contacts being operable when neither of said relay operating coils is energized to connect said field windings to establish a regenerative braking circuit, selection of the other of said relay operating coils and the other of said field windings for energization causing reversal of said motor.

DONALD C. REEK.

No references cited.